March 7, 1939.  M. P. LINK  2,150,002
METHOD FOR FORMING SEAMS
Filed Dec. 2, 1935  2 Sheets-Sheet 1

Inventor
MAXIMILIAN P. LINK
By
His Attorney

March 7, 1939.  M. P. LINK  2,150,002
METHOD FOR FORMING SEAMS
Filed Dec. 2, 1935  2 Sheets-Sheet 2
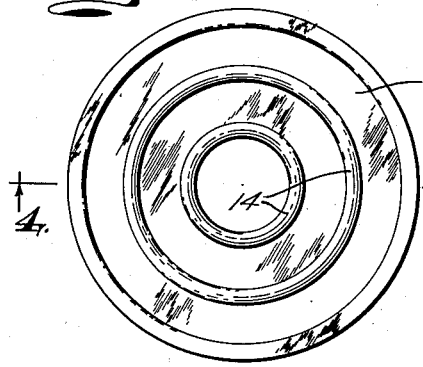
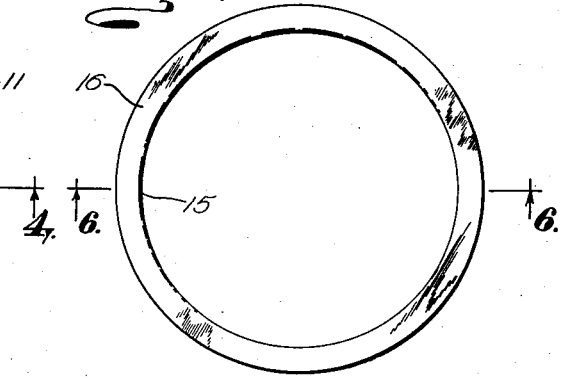
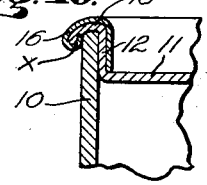
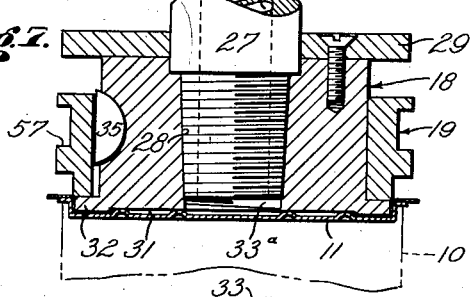
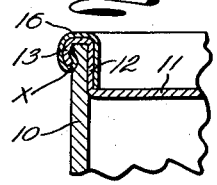
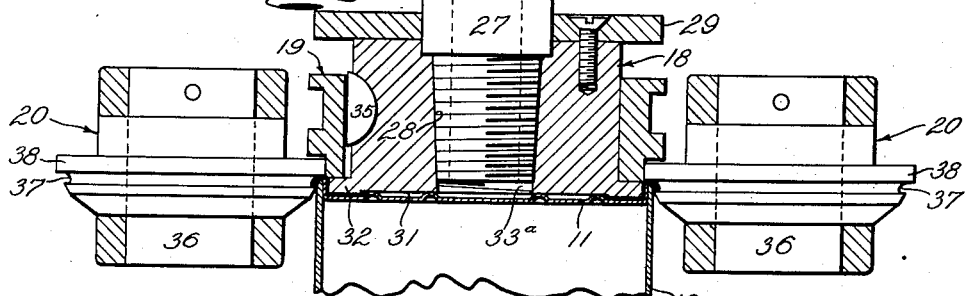
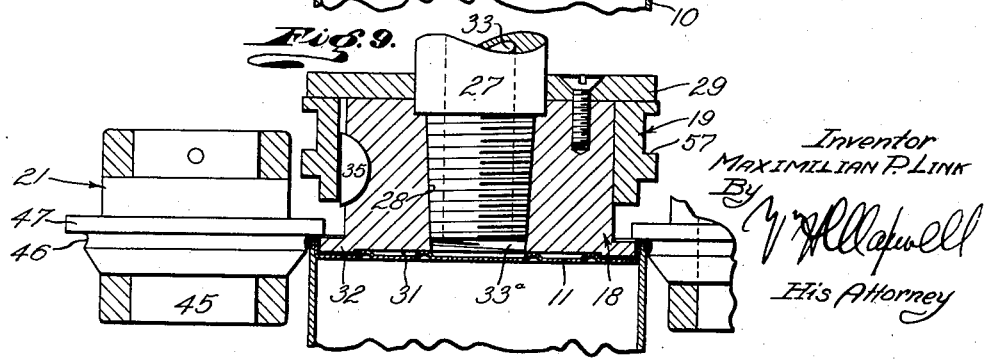
Inventor
Maximilian P. Link
By
His Attorney Patented Mar. 7, 1939

2,150,002

UNITED STATES PATENT OFFICE 2,150,002

METHOD FOR FORMING SEAMS

Maximilian Paul Link, Los Angeles, Calif.

Application December 2, 1935, Serial No. 52,594

3 Claims. (Cl. 113—121)

This invention relates to a method for forming seams and relates more particularly to a method for forming seams in the manufacture of containers and the like. A general object of this invention is to provide a rapid efficient and commercially practical method for making seams in the manufacture of containers and the like.

Another object of this invention is to provide a method for producing seams that provides for the proper accurate positioning of the parts or work before and during the successive seaming operations.

Another object of this invention is to provide a method for forming seams between paper, fiber, cardboard stock and similar materials employed in the manufacture of paper containers that dependably positions and properly relates the parts of the assembly to be seamed without distortion of the same, thereby assuring the perfect seaming of the parts.

Another object of this invention is to provide a method that effects the positioning and definite locating of the container end and the metal seam ring with respect to one another and with respect to the container body preliminary to and during the first seaming operation without interfering with the first seaming operation.

Another object of this invention is to provide a rapid efficient method for seaming parts of a container or the like, that provides for the initial seaming operation to lightly or removably secure the container end to the container body and for a final seaming operation to finally secure the end of the container body with the same anvil head and without shifting the anvil head or the container.

Another object of this invention is to provide a seaming method of the character mentioned that effects or provides for a secure uniform and fluidtight seam between the container body and the container end.

Figure 1:
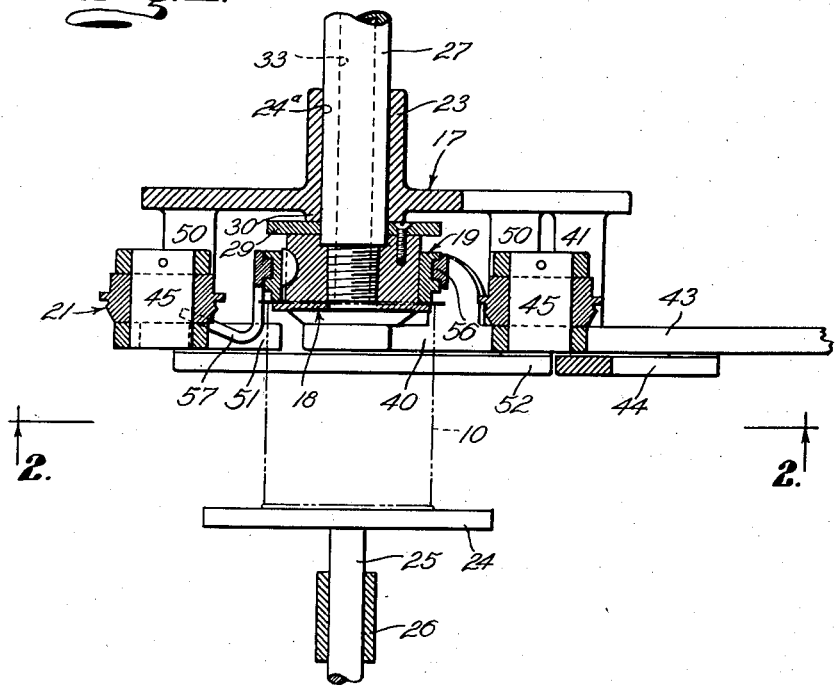
Figure 2:
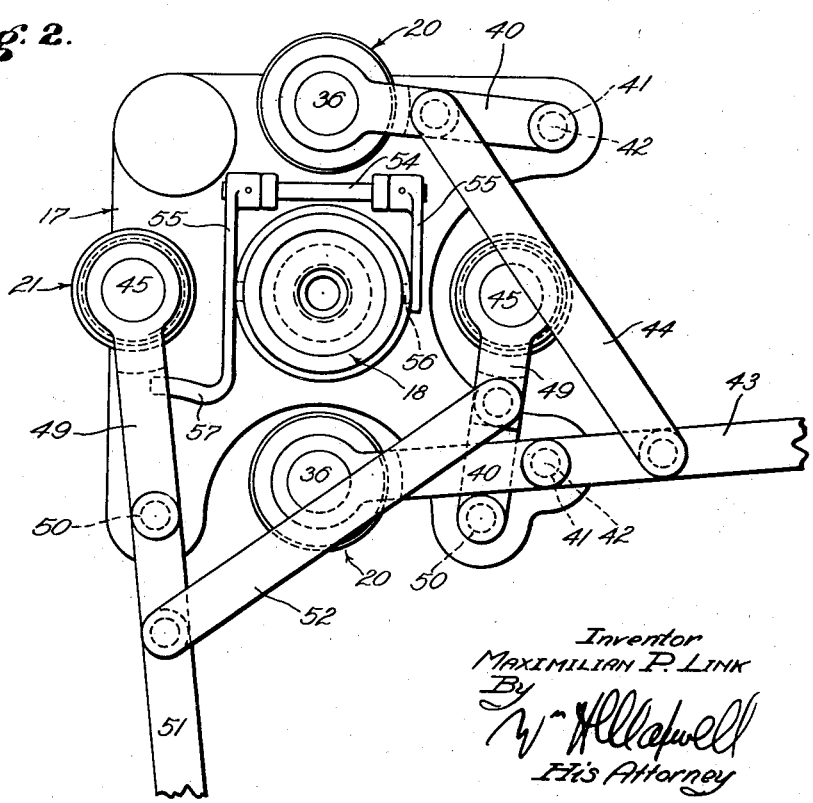

The various objects and features of my invention will be fully understood from the following detailed description of a typical preferred manner of carrying out the method of my invention, throughout which description reference is made to the accompanying drawings, in which:

Fig. 1 is a central vertical detailed sectional view of a typical form of mechanism of the present invention showing a container in broken lines in position for the first or initial seaming operation. Fig. 2 is a bottom elevation of the mechanism being a view taken substantially as indicated by line 2—2 on Fig. 1. Fig. 3 is a plan elevation of a container end. Fig. 4 is a transverse detailed sectional view of the container end taken as indicated by line 4—4 on Fig. 3. Fig. 5 is a plan elevation of a seam ring. Fig. 6 is a transverse detailed sectional view of the ring taken as indicated by line 6—6 on Fig. 5. Fig. 7 is an enlarged fragmentary vertical detailed sectional view of the head showing the assembly of the container end and the seam ring in position thereon for the first seaming operation. Fig. 8 is a view similar to Fig. 7 showing the first operation dies in their active positions. Fig. 9 is a view similar to Fig. 7 showing the second operation dies performing the second seaming operation. Fig. 10 is an enlarged fragmentary detailed sectional view of the container illustrating the parts following the first seaming operation and Fig. 11 is a view similar to Fig. 10 showing the seam following the second or final seaming operation.

The method of this invention may be employed in the connecting or seaming of various articles and in the manufacture of various types of devices. Throughout the following detailed disclosure the invention will be described as employed in the manufacture of a container of the general character fully described and claimed in my co-pending application entitled Container, Serial No. 48,846, filed November 8, 1935. It is to be understood that the invention is not to be construed as limited or restricted to the specific details or application about to be described but is to be taken as including any features or modifications that may fall within the scope of the claims.

It is believed that the method of this invention will be better understood following a description of the mechanism useful in performing the method. Accordingly, I will proceed with a detailed description of a form of mechanism for performing the method and will follow such description with a disclosure of the manner of carrying out the method in the operation of the mechanism.

The container which the typical form of mechanism illustrated in the drawings is adapted to handle comprises a container body 10 which may be cylindrical and which may be formed of paper, cardboard stock, fiber or other materials. The head or end 11 of the container to be attached to the container body 10 is a disc-like member of paper, cardboard stock, fiber or similar materials. The periphery of the end 11 is flanged having an axial outwardly extending flange 12 and a radial flange 13 projecting outwardly from the outer end of the flange 12. As initially formed or as shaped for arrangement on the container body 10 the radial flange 13 is substantially parallel to the plane of the web or body of the end. In practice the end 11 may have annular corrugations or ridges 14. The container further includes a seam ring 15 of metal or the like. The ring 15 is substantially cylindrical and is adapted to bear outwardly against the axial flange 12 of the container end 11. The ring 15 has a radial flange 16 to cover or overlie the radial flange 13 of the end 11. It is to be understood that the container end 11 and the seam ring 15 are separate elements and are adapted to be assembled in the relation illustrated in Fig. 7 of the drawings for attachment to or connection with the container body 10.

The seaming mechanism illustrated in the drawings includes, generally, a frame or body 17, a head 18, an abutment die or positioning die 19 shiftable on the head 18, initial or first seaming tools or dies 20 operable to initially roll or curl the flanges 13 and 16, and final or second operating seaming dies 21 operable to finally and securely roll the flanges 13 and 16 onto the container body 10.

The frame or body 17 is provided to carry the dies 20 and 21 and may form a support or bearing for the head 18. The body 17 may be varied considerably in shape and construction without departing from the spirit of the invention. In the particular case illustrated in the drawings the body 17 is a horizontally disposed member or structure that is generally flat or plate-like. A substantially central bearing boss 23 projects from the upper side of the body 17 for the purpose to be hereinafter described. A vertical opening 24ª passes through the body 17 and the boss 23. In accordance with the invention the body 17 is spaced above a rotatable platen or table 24 for carrying the work or container. The table 24 may be a simple disc-like part supported in coaxial relation to the opening 24ª. In the drawings I have shown the table 24 carried by a spindle 25 supported in a bearing 26. In practice the table 24 may be movable vertically to move the work or container into and out of operative position with relation to the head 18. It is to be understood, of course, that the table 24 for supporting the work may be stationarily mounted and that the head 18 may be shiftable vertically to permit the positioning of the container in its operative position on the table for the seaming operation and to permit the removal of the container from the table following the seaming operation.

The head 18 forms a carrier for the assembly of the container end 11 and the seam ring 15 and constitutes an inner die or anvil part during the seaming operations. The head 18 is a substantially cylindrical member or block disposed at the under side of the body 17. In practice the head 18 is in coaxial relation to the table 24 being supported by a vertical spindle 27 passing through the opening 24ª of the body 17. The lower portion of the spindle 27 may be threaded into an opening 28 in the head 18 to secure the head to the spindle. The invention contemplates the rotating of the spindle 27 or the rotation of the dies 20 and 21 about the head 18 or both, during the seaming operations. Accordingly, the spindle 27 may be considered as rotatable and as having a suitable driving or rotating means. A suitable thrust plate and stop plate 29 is secured to the upper end of the head 18 and is adapted to bear upwardly against a boss 30 on the under side of the body 17.

The lower end or surface 31 of the head 18 is flat and horizontal to receive the container end 11. The invention provides an annular outwardly projecting radial flange 32 on the head 18. The flange 32 is at the lower end portion of the head 18 and is designed to fit within the ring 15 during the seaming operations to form an abutment or inner seaming tool part. The flange 32 has a cylindrical peripheral surface for cooperating with the interior of the seam ring 15 and has a flat horizontal lower surface that may be co-extensive with the lower surface of the head 18 or that may be stepped downwardly from the lower surface of the head, as illustrated in the drawings. The upper side or surface of the flange 32 is preferably flat and horizontal. In accordance with the invention the spindle 27 is tubular whereby the container end 11 carrying the seam ring 15 may be subjected to the influence of a reduced pressure to be held in position against the lower end 31 of the head 18 by the action of atmospheric pressure. The longitudinal opening 33 of the tubular spindle 27 may be maintained in communication with any suitable source of reduced pressure or partial vacuum. The spindle 27 terminates above the lower end of the opening 28 whereby the lower portion of the opening forms a socket or recess 33ª in which a reduced pressure exists to insure the proper retention of the container end 11 on the head 18 through the action of atmospheric pressure. Where the container end 11 has ridges 14 these ridges bear upwardly against the lower surface 31 of the head 18 to seal therewith and maintain the proper reduced pressure in the recess 33.

The abutment and positioning die 19 is carried by the head 18 to assist in positioning the assembly of the container end 11 and the ring 15 and to accurately locate and hold the seam ring 15 in place for the first seaming operation. The die 19 is a tubular or sleeve-like part surrounding the head 18 above its flange 32. In accordance with the invention the die 19 is shiftable but non-rotatable on the head 18. A key or keys 35 connect the die 19 with the head 18 for axial movement thereon and prevent rotation of the die on the head. In accordance with the invention the lower end of the die 19 slightly overhangs the flange 32 to have positioning and holding contact with the seam ring 15. The parts are related so that the overhanging part of the die 19 cooperates with the radial flange 16 of the ring 15 at or adjacent its line of joinder with the body of the ring. This contact of the lower overhanging part of the die 19 with the ring 15 holds the ring against upward movement and against tilting so that the ring is properly maintained in position for the first seaming operation. The die 19 remains in cooperation with the seam ring 15 during the first seaming operation and is then shifted upwardly to a position where it does not interfere with the second seaming operation.

The first operating seaming tools or dies 20 are provided to give the flanges 13 and 16 their initial or preliminary roll or curvature as shown in Figs. 8 and 10 of the drawings. There is preferably a pair of diametrically opposite dies 20 of like configuration. The dies 20 are substantially cylindrical elements rotatably carried by individual spindles 36. Each die 20 has an annular groove 37 in its periphery. The grooves 37 have downwardly and inwardly curved walls and are shaped to give the desired roll to the flanges 13 and 16. The outer surfaces of the dies 20 are tapered away from or tapered downwardly and inwardly from the grooves 37. Substantially cylindrical annular flanges or lips 38 are provided on the dies 20 to overhang the grooves 37. The peripheries of the lips 38 are adapted to have rolling cooperation with the peripheral surface of the positioning die 19 and the under sides of the lips 38 are substantially flat and horizontal to have engagement with the upper side of the ring flange 16. The under sides of the lips 38 merge with the walls of the grooves 37. The portions of the dies 20 above the lips 38 are preferably reduced to have ample clearance with the positioning die 19.

Means is provided for simultaneously shifting the first operation dies 20 into and out of their operative or seaming positions. The means for shifting the dies 20 includes two levers 40 each supporting a die spindle 36. Posts or legs 41 project downwardly from the body 17 and the levers 40 are pivotally supported by the legs 41 at 42. One lever 40 has an operating extension or operating part 43 extending outwardly from its point of pivotal connection with the leg 41. The two levers 40 are interconnected for simultaneous operation. A link 44 has one end pivotally connected with the operating part 43 and has its other end pivotally connected with the other lever 40 at a point between its ends. From an inspection of Fig. 2 of the drawings it will be apparent how swinging of the operating part 43 simultaneously moves the levers 40 to shift the dies 20 toward and away from the head 18. The operating part 43 may be manually operated or may be operated by a suitable driving or actuating mechanism.

The second seaming operation dies 21 are provided to give the partially rolled flanges 13 and 16 their final curvature or roll to have gripping and sealing contact with the wall of the container body 10. The dies 21 are tubular elements rotatably supported on individual spindles 45. The dies 21 are generally cylindrical in their configuration and are alike. There is preferably a pair of diametrically opposite dies 21. Each die 21 has an annular groove 46 in its periphery provided with a curved wall for giving the seam flanges their proper shape. Annular flanges or lips 47 are provided on the dies 21 to overhang their grooves 46. The lips 47 have cylindrical peripheries and flat horizontal lower surfaces. In accordance with the invention the lips 47 are proportioned to overhang the upper end or bead of the rolled ring flange 16 and to overlie to some extent the flange 32 of the head 18. The peripheries of the dies 21 may be bevelled downwardly and inwardly away from the groove 46.

Means is provided for simultaneously shifting the dies 21 into and out of their operative or seaming positions. The means for shifting the dies 21 includes levers 49 supporting the spindles 45. Projections or legs 50 are provided on the under side of the body 17 to pivotally carry the levers 49. One lever 49 has an operating part 51 extending outwardly beyond its point of pivotal support. The levers 49 are operatively connected for simultaneous pivoting. A link 52 has one end pivotally connected with the operating part 51 of one lever 49 and has its opposite end pivotally connected with the other lever 49 at a point between its ends. Oscillation or swinging of the operating part 51 of course moves the dies 21 toward and away from the head 18. The operating part 51 may be operated manually or mechanically by suitable operating means to shift the dies 21 between their active and inactive positions.

Due to the fact that the lips 47 of the dies 21 project completely over the curled or rolled ring flange 13 and partially overhang the flange 32 of the head 18, it is necessary to shift the positioning die 19 upwardly away from the flange 32 before the dies 21 come into their active positions. The invention provides means for automatically shifting the positioning die 19 out of its active position when the second operation dies 21 are shifted inwardly to act on the container seam. The means for shifting the die 19 on the head 18 may include a yoke 54 pivotally supported on the under side of the body 17 to have its arms 55 project at opposite sides of the head 18 and die 19. Pins 56 are provided on the arms 55 to cooperate with an annular groove 57 in the die 19 whereby pivoting of the yoke 54 shifts the die axially on the head 18. One arm 55 of the yoke 54 has an extension in the form of a cam 57. The cam 57 projects laterally from the outer end of the arm 55 and is inclined upwardly and outwardly to extend over one of the levers 49. The cam 57 is in position for cooperation with the lever 49 and when the lever 49 is swung inwardly toward the head 18 it cooperates with the cam 57 to pivot the yoke 54 in a direction to shift the die 19 upwardly on the head 18. When the dies 21 are shifted outwardly to their normal or inactive positions the weight of the die 19 automatically moves the die 19 to its normal active position where it rests on the head flange 32.

In the seaming operation it is essential, of course, that there be relative rotation between the head 18 and the dies 20 and 21. The invention is not concerned with the means for effecting such relative rotation and any conventional or special means may be employed for this purpose. In practice the spindle 27 may be rotated, the body 17 may be rotated relative to the spindle or the body and spindle may be rotated in opposite directions to carry out the seaming operations.

The operation of the seaming mechanism and the method of the invention as carried out with the typical form of mechanism described above, is as follows:

The seam ring 15 is first assembled on the container end 11 to have its flange 16 overlie and seat on the flange 13. The assembly of the end 11 and the ring 15 is then arranged on the under side of the head 18. The vacuum or reduced pressure in the opening 33 and the recess 33ª causes the atmospheric pressure to hold the end 11 upwardly against the lower end of the head 18. Thus the assembly of the container end 11 and the seam ring 15 is properly temporarily held in position on the head 18. The engagement of the ring 15 with the periphery of the head flange 32 centralizes the assembly of the end 11 and the ring 15 on the head. The overhanging edge portion of the die 19 engages the ring 15 to definitely position it and to prevent the ring from tilting or shifting upwardly. In the event that the container end 11 is to be immediately and finally secured to the container body 10 the body 10 may be arranged on the table 24 and the table raised or the head 18 lowered to bring the end 11 and the body 10 in the proper relation. If desired, however, the flanges 13 and 16 of the end 11 and the seam ring 15 may be given their initial roll or curl before arranging the assembly of the ring and end on the container body. When the container body 10 is properly related to the end 11 on the head 18 the upper end of the body 10 engages the under side of the flange 13. This relationship is clearly illustrated in Fig. 7 of the drawings. The work or container is then positioned for the first seaming operation.

To perform the first or initial phase of the seaming operation the operating part 43 is moved to swing the dies 20 into engagement with the flanges 13 and 16. As described above, there is relative rotation between the head 18 and the dies 20 and 21 and the engagement of the dies 20 with the flanges 13 and 16 during this relative rotation curls or rolls the flanges giving them their initial seamed configuration. It will be apparent how the flanges 13 and 16 receive in the grooves 37 are curled downwardly and inwardly and how the ring flange 16 is rolled to have a part X engage under the surface of the flange 13 as illustrated in Fig. 10. Following this first rolling or seaming operation the dies 20 are returned to their normal or inoperative positions by proper movement of the operating part 43. To perform the final seaming operation the operating part 51 is swung or moved to shift the dies 21 inwardly into contact with the partially rolled ring flange 16. As the dies 21 move inwardly the cooperation of the lever 49 with the cam 57 moves the die 19 upwardly away from the head flange 32. The cooperation of the grooves 46 with the partially rolled ring flange 16 curls or rolls the flanges 13 and 16 inwardly so that they tightly grip the wall of the container body 10. In practice the part X thus rolled inwardly is made to securely grip the wall of the body 10 as well as the curled edge portion of the end flange 13. The final rolling or seaming operation secures the end 11 to the container body 10 in tight and leakproof engagement therewith. The dies 21 may then be swung outwardly away from the head 11 allowing the die 19 to move to its normal down position and the assembly of the container body 10 and its end 11 is then removed from the head 18 conditioning the mechanism for another operation.

From the above it will be seen that the method provided by the present invention comprises, generally, the assembling of a container end 11 and a seam ring 15, the arrangement of the assembly of the end 11 and the ring 15 on an anvil part 18, the definite positioning of the ring 15 by engaging it with an overhanging shoulder 19 on the anvil part 18, the temporary retention of the assembly of the end 11 and the ring 15 on the anvil part 18 by subjecting it to the action of a reduced pressure, the initial curling or rolling of the seam or flange parts 13 and 16 of the end and ring assembly while the assembly is thus retained on the anvil part 18, the withdrawal or removal of the positioning shoulder 19 from the ring 15 and the final rolling and clamping of the seam parts 13 and 16 onto the container body 10 by exerting an inward pressure against them while supported on the anvil part 18.

Having described only a typical preferred manner of carrying out the method of my invention, I do not wish to be limited or restricted to the specific details herein set forth, but wish to reserve to myself any variations or modifications that may appear to those skilled in the art or fall within the scope of the following claims:

Having described my invention, I claim:

1. The method of forming a seam between a tubular body and an assembly of an end having an axial peripheral flange and a radial flange on the axial flange and a seam ring within the axial flange of the end, the ring having a radial flange overlying the radial flange of the end, said method including, arranging the assembly of the end and ring on the end of the body to project into the body and overlie the end of the body, placing the face of the end and the interior of the ring against an abutment and applying axial pressure to the body to hold the end against the abutment, applying a temporary abutment to the radial flange of the ring to resist said pressure, simultaneously partially curling the radial flanges of the end and ring to wrap the edge portion of the ring flange around the edge portion of the radial end flange and leave the same in pressure engagement with the outer wall of the body, removing the temporary abutment and then completing the seaming of the radial flanges to the body by simultaneously confining the end and ring axially on the body and forcing the wrapped edge portions of the ring and end radial flanges radially inward into tight sealing engagement with the outer surface of the body.

2. The method of forming a seam between a tubular body and an assembly of an end having an axial peripheral flange and a radial flange on the axial flange and a seam ring within the axial flange of the end, the ring having a radial flange overlying the radial flange of the end, said method including, arranging the assembly of the end and ring on the end of the body to project into the body and overlie the end of the body, holding the face of the end and the inner surface of the ring against an abutment, arranging a temporary abutment against the radial flange of the ring to maintain the ring in a given position with respect to the end, simultaneously partially curling the radial flanges of the end and ring to wrap the edge portion of the ring flange around the edge portion of the radial end flange and leave the same in pressure engagement with the outer wall of the body, removing the temporary abutment, and then completing the curling of the radial flanges by simultaneously confining the end and ring axially on the body and forcing the wrapped edge portions of the ring and end radial flanges radially inward into tight sealing engagement with the outer surface of the body.

3. The method of forming a seam between a tubular body and an assembly of an end having an axial peripheral flange and a radial flange on the axial flange and a seam ring within the axial flange of the end, the ring having a radial flange overlying the radial flange of the end, said method including, arranging the assembly of the end and ring on the end of the body to project into the body and overlie the end of the body, holding the face of the end and the inner surface of the ring against an abutment, arranging a temporary abutment against the radial flange of the ring to maintain the ring in a given position with respect to the end, simultaneously partially curling the radial flanges of the end and ring to wrap the edge portion of the ring flange around the edge portion of the radial end flange and leave the same in pressure engagement with the outer wall of the body, removing the temporary abutment, and then curling the radial flanges to bring the radial ring flange into deforming gripping and sealing engagement with the outer surface of the body by simultaneously confining the end ring axially on the body and forcing the wrapped together edge portions of the ring and end radial flanges inwardly while the end and ring are so confined.

MAXIMILIAN PAUL LINK.